(12) United States Patent
Abe et al.

(10) Patent No.: US 10,780,703 B2
(45) Date of Patent: Sep. 22, 2020

(54) CHANNEL CONTROL APPARATUS AND INKJET RECORDING APPARATUS

(71) Applicant: CANON KABUSHIKI KAISHA, Tokyo (JP)

(72) Inventors: Takashi Abe, Kawasaki (JP); Tsuyoshi Saeki, Kawasaki (JP); Toshiaki Tokisawa, Kawasaki (JP); Ryoma Arai, Kawasaki (JP); Yumi Mukoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/572,459

(22) Filed: Sep. 16, 2019

(65) Prior Publication Data

US 2020/0101744 A1 Apr. 2, 2020

(30) Foreign Application Priority Data

Sep. 28, 2018 (JP) .................................. 2018-184605

(51) Int. Cl.
*B41J 2/175* (2006.01)
*F16K 7/16* (2006.01)

(52) U.S. Cl.
CPC ................. *B41J 2/175* (2013.01); *F16K 7/16* (2013.01)

(58) Field of Classification Search
CPC ...................................................... B41J 2/175
See application file for complete search history.

(56) References Cited

U.S. PATENT DOCUMENTS

| 3,298,660 A * | 1/1967 | Price ....................... F16K 7/123 251/331 |
| 2005/0269533 A1* | 12/2005 | Fedegari .................. F16K 7/16 251/63.5 |
| 2012/0055555 A1* | 3/2012 | Saint-Paul ................ F16K 7/14 137/1 |

FOREIGN PATENT DOCUMENTS

JP 2013-521454 A 6/2013

\* cited by examiner

*Primary Examiner* — Huan H Tran
(74) *Attorney, Agent, or Firm* — Canon U.S.A., Inc. I.P. Division (57) ABSTRACT

A channel control apparatus includes: a diaphragm portion displaceable between an opening position to open a channel and a closing position to close the channel; an abutment portion for moving in a first direction and a second direction opposite to the first direction by a driving source; and a gripping member that has an inclined surface portion for abutting against the abutment portion and grips the diaphragm portion, wherein when the abutment portion moves in the first direction, the gripping member displaces the diaphragm portion to the opening position by the abutment portion abutting against the inclined surface portion, and wherein when the abutment portion moves in the second direction, the gripping member displaces the diaphragm portion to the closing position by the abutment portion being separated from the inclined surface portion.

7 Claims, 9 Drawing Sheets

CHANNEL CONTROL APPARATUS AND INKJET RECORDING APPARATUS

BACKGROUND OF THE INVENTION

Field of the Invention

The present disclosure relates a channel control apparatus that controls a flow of a fluid and an inkjet recording apparatus.

Description of the Related Art

PCT Japanese Translation Patent Publication No. 2013-521454 discloses, as a member that controls a flow in a channel, a diaphragm valve or diaphragm pump that uses a flexible diaphragm. By gripping a part of the diaphragm with a gripping member and driving the gripping member by an actuator, the diaphragm is displaced and the channel is opened or closed. According to the diaphragm valve of PCT Japanese Translation Patent Publication No. 2013-521454, a gripped portion of the diaphragm is elastically changed to be gripped by the gripping member, and therefore, a configuration is simplified and downsizing and ease of assembly are achieved.

According to the configuration of PCT Japanese Translation Patent Publication No. 2013-521454, however, in a case where a pressure is generated in the channel, the gripping member may be detached from the diaphragm because the gripping member grips the gripped portion by the elastic change of the diaphragm. As a result, there is a possibility that the displacement of the diaphragm is not allowed, and therefore, the diaphragm is difficult to achieve a function as a valve.

SUMMARY OF THE INVENTION

The disclosure is made in view of the aforementioned situation and provides a channel control apparatus that is very reliable with a simple configuration.

According to an embodiment of the present disclosure a channel control apparatus includes: a diaphragm portion displaceable between an opening position to open a channel and a closing position to close the channel, an abutment portion for moving in a first direction and a second direction opposite to the first direction by a driving source, and a gripping member that has an inclined surface portion for abutting against the abutment portion and grips the diaphragm portion, wherein when the abutment portion moves in the first direction, the gripping member displaces the diaphragm portion to the opening position by the abutment portion abutting against the inclined surface portion, and wherein when the abutment portion moves in the second direction, the gripping member displaces the diaphragm portion to the closing position by the abutment portion being separated from the inclined surface portion.

Further features of the present disclosure will become apparent from the following description of exemplary embodiments with reference to the attached drawings.

DESCRIPTION OF THE EMBODIMENTS

Although an embodiment of the disclosure will be described below with reference to the drawings, the disclosure is not limited to the following embodiment and not all combinations of features described in this embodiment are necessarily essential for the solution to be provided by the disclosure. Note that, the same constituent elements will be given the same reference signs in the following description. Further, relative arrangement, shapes, and the like of constituent elements described in the embodiment are merely examples, and should not be considered as limiting the scope of the disclosure only to them.

First Embodiment

Figure 1:
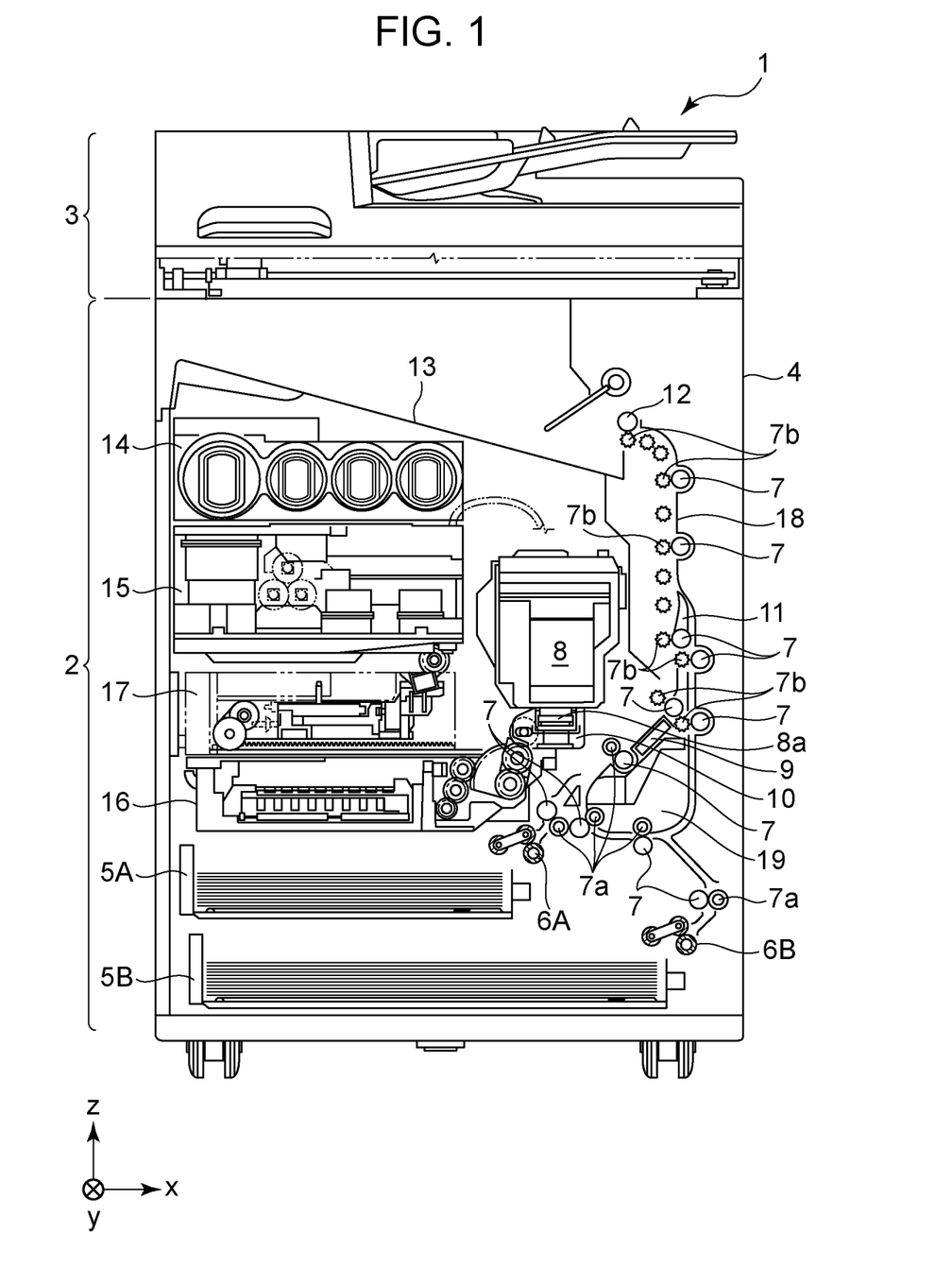
FIG. 1 illustrates an inkjet recording apparatus in a standby state.

FIG. 1 illustrates an internal configuration of an inkjet recording apparatus (hereinafter, recording apparatus) 1 in the present embodiment. In the figure, hereinafter, an x-direction indicates a horizontal direction, a y-direction (direction perpendicular to a paper surface) indicates a direction in which ejection ports are arrayed in a recording head 8 described later, and a z-direction indicates a vertical direction.

The recording apparatus 1 is a multifunction peripheral including a print unit 2 and a scanner unit 3 and is capable of performing various kinds of processing relating to a recording operation and a reading operation by the print unit 2 and the scanner unit 3 individually or in an interlocking manner. The scanner unit 3 includes an ADF (Automatic Document Feeder) and an FBS (Flat Bed Scanner) and is capable of reading of a document automatically fed by the ADF and reading (scanning) of a document placed on a document table of the FBS by a user. Note that, the present embodiment is the multifunction peripheral having both the print unit 2 and the scanner unit 3, but may be an aspect in which the scanner unit 3 is not included. FIG. 1 illustrates the recording apparatus 1 in a standby state where the recording apparatus 1 performs neither the recording operation nor the reading operation.

In the print unit 2, at a bottom of a case 4 in a vertically downward direction, a first cassette 5A and a second cassette 5B that store a recording medium (cut sheet) S are installed in an attachable and detachable manner. Comparatively small recording media up to an A4 size and comparatively large recording media up to an A3 size are respectively stored in the first cassette 5A and the second cassette 5B in a piled-up manner. In a vicinity of the first cassette 5A, a first feed unit 6A that feeds the stored recording media by separating the recording media one by one is provided. Similarly, in a vicinity of the second cassette 5B, a second feed unit 6B is provided. When the recording operation is performed, the recording medium S is selectively fed from any one of the cassettes.

Conveyance rollers 7, a discharge roller 12, pinch rollers 7a, spurs 7b, a guide 18, an inner guide 19, and a flapper 11 are conveyance mechanisms that guide the recording medium S in a predetermined direction. The conveyance rollers 7 are driving rollers that are arranged on upstream and downstream sides of the recording head 8 and driven by a conveyance motor (not illustrated). The pinch rollers 7a are driven rollers that are arranged on the upstream side of the recording head 8 and nip the recording medium S and rotate together with the conveyance rollers 7. The discharge roller 12 is a driving roller that is arranged at a most downstream part in a conveyance path and driven by a conveyance motor (not illustrated). The spurs 7b are arranged on the downstream side of the recording head 8 and guide the recording medium S in a predetermined direction. A spur 7b that is provided at a position facing a conveyance roller 7 or the discharge roller 12 sandwiches and conveys the recording medium S together with the conveyance roller 7 or the discharge roller 12.

The guide 18 is provided in the conveyance path of the recording medium S and guides the recording medium S in the predetermined direction. The inner guide 19 is a member extending in the y-direction, has a curved side surface, and guides the recording medium S along the side surface. The flapper 11 is a member used to switch the direction in which the recording medium S is conveyed during a two-sided recording operation. A discharge tray 13 is a tray on which the recording medium S discharged by the discharge roller 12 after completion of the recording operation is stacked and retained.

The recording head 8 of the present embodiment is a color inkjet recording head of a full-line type (line head), and a plurality of ejection ports from which ink is ejected in accordance with recording data are arrayed so as to correspond to a width of the recording medium S in the y-direction in FIG. 1. When the recording head 8 is in a standby position illustrated in FIG. 1, an ejection port surface 8a of the recording head 8 is capped by a cap unit 10. A position of the cap unit 10 is also referred to as a capping position. When the recording head 8 performs the recording operation, a direction of the recording head 8 is changed by a print controller 202 described later in such a manner that the ejection port surface 8a faces a platen 9. The platen 9 is constituted by a flat plate extending in the y-direction, and supports the recording medium S, on which the recording operation is performed by the recording head 8, from a back side thereof. The movement of the recording head 8 from the standby position to a recording position will be described in detail later.

An ink tank unit 14 accumulates ink of four colors to be supplied to the recording head 8. An ink supply unit 15 is provided on the way of a channel connecting the ink tank unit 14 and the recording head 8 and adjusts a pressure and a flow rate of ink within the recording head 8 to an appropriate range. The present embodiment adopts an ink supply system of a circulation type so that the ink supply unit 15 adjusts the pressure of the ink supplied to the recording head 8 and the flow rate of the ink collected from the recording head 8 to an appropriate range.

A maintenance unit 16 includes the cap unit 10 and a wiping unit 17 and causes the cap unit 10 and the wiping unit 17 to operate at predetermined timing to perform a maintenance operation for the recording head 8. Details of the maintenance unit 16 will be described later.

Figure 2:
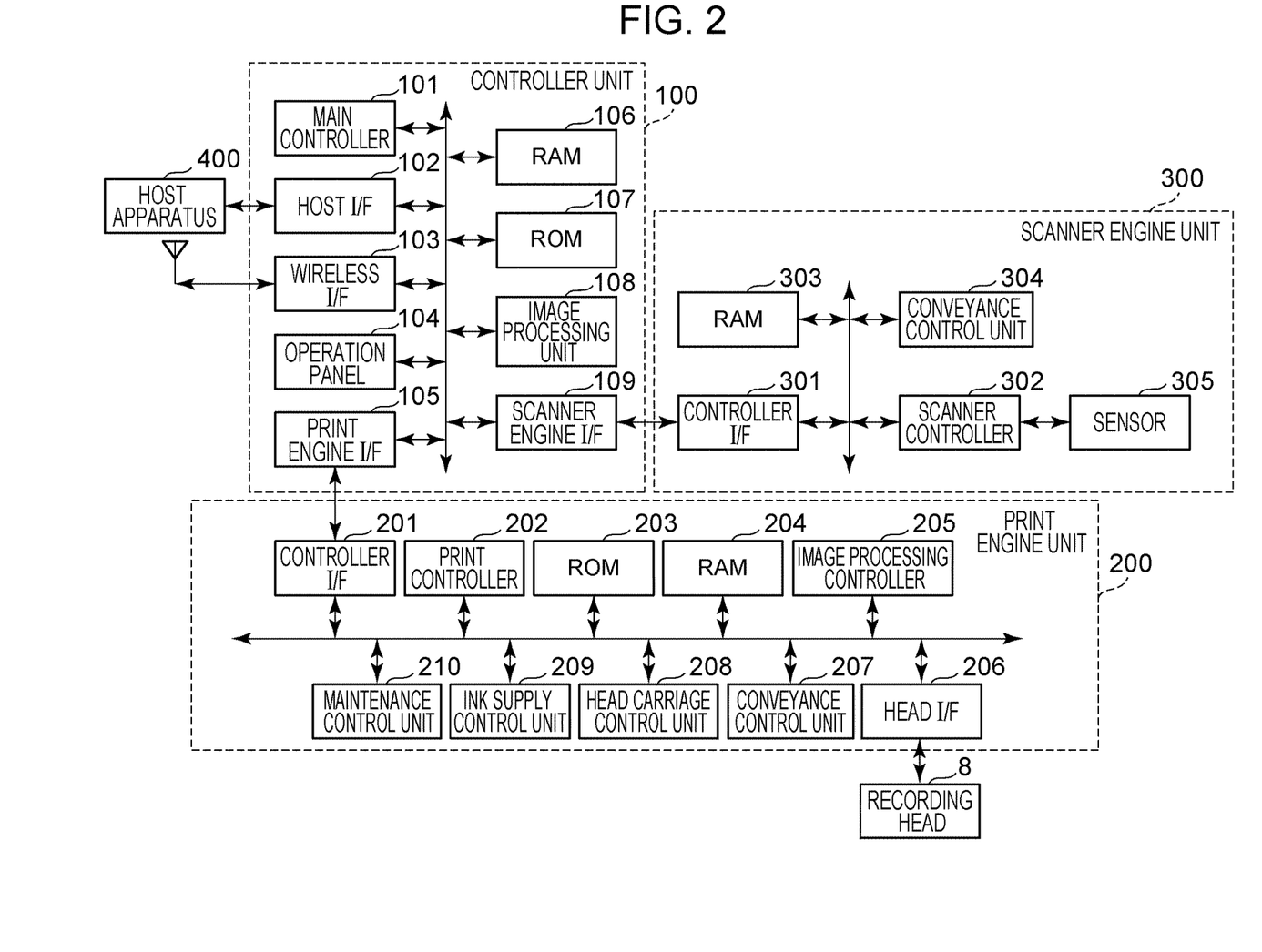
FIG. 2 illustrates a control configuration of the inkjet recording apparatus.

FIG. 2 is a block diagram illustrating a control configuration in the recording apparatus 1. The control configuration mainly includes a print engine unit 200 that comprehensively controls the print unit 2, a scanner engine unit 300 that comprehensively controls the scanner unit 3, and a controller unit 100 that comprehensively controls the entire recording apparatus 1. The print controller 202 controls various mechanisms of the print engine unit 200 in accordance with an instruction from a main controller 101 of the controller unit 100. Various mechanisms of the scanner engine unit 300 are controlled by the main controller 101 of the controller unit 100. Details of the control configuration will be described below.

In the controller unit 100, the main controller 101 constituted by a CPU controls the entire recording apparatus 1 by using a RAM 106 as a work area in accordance with a program and various parameters stored in a ROM 107. For example, when a print job is input from a host apparatus 400 via a host I/F 102 or a wireless I/F 103, an image processing unit 108 performs predetermined image processing for image data, which is received as a recording target, in accordance with an instruction from the main controller 101. Then, the main controller 101 transmits the image data subjected to the image processing to the print engine unit 200 via a print engine I/F 105.

Note that, the recording apparatus 1 may acquire image data from the host apparatus 400 through wireless or wired communication or from an external storage apparatus (such as a USB (Universal Serial Bus) memory) connected to the recording apparatus 1. A communication method for use in the wireless or wired communication is not limited. For example, Wi-Fi (Wireless Fidelity) (registered trademark) or Bluetooth (registered trademark) is applicable as the communication method for use in the wireless communication. Further, USB or the like is applicable as the communication method for use in the wired communication. Further, for example, when a reading command is input from the host apparatus 400, the main controller 101 transmits the command to the scanner unit 3 via a scanner engine I/F 109.

An operation panel 104 is a mechanism for a user to perform input and output for the recording apparatus 1. The user is able to give an instruction as to an operation, such as copying or scanning, to set a printing mode, or to recognize information about the recording apparatus 1 each via the operation panel 104.

In the print engine unit 200, the print controller 202 constituted by a CPU controls various mechanisms of the print unit 2 by using a RAM 204 as a work area in accordance with a program and various parameters stored in a ROM 203. When various commands and image data are received via a controller I/F 201, the print controller (control unit) 202 temporarily saves the image data in the RAM 204. The print controller 202 causes an image processing controller 205 to convert the saved image data into recording data so that the recording head 8 is able to use the recording data in the recording operation.

When the recording data is generated, the print controller 202 causes the recording head 8 to perform the recording operation based on the recording data via a head I/F 206. At this time, the print controller 202 conveys the recording medium S by driving the first feed unit 6A, the second feed unit 6B, the conveyance rollers 7, the discharge roller 12, and the flapper 11 which are illustrated in FIG. 1 via a conveyance control unit 207. In accordance with an instruction from the print controller 202, the recording operation by the recording head 8 is performed by interlocking a conveyance operation of the recording medium S and printing processing is performed.

A head carriage control unit 208 changes the direction and the position of the recording head 8 in accordance with the operation state, such as a maintenance state or a recording state, of the recording apparatus 1. An ink supply control unit 209 controls the ink supply unit 15 so that a pressure of ink supplied to the recording head 8 is adjusted within an appropriate range. A maintenance control unit 210 controls operations of the cap unit 10 and the wiping unit 17 in the maintenance unit 16 at a time of performing the maintenance operation for the recording head 8.

In the scanner engine unit 300, the main controller 101 controls a hardware resource of a scanner controller 302 by using the RAM 106 as a work area in accordance with a program and various parameters stored in the ROM 107. Thereby, various mechanisms included in the scanner unit 3 are controlled. For example, by the main controller 101 controlling the hardware resource within the scanner controller 302 via a controller I/F 301, a document mounted on the ADF by the user is conveyed via a conveyance control unit 304 and read by a sensor 305. Then, the scanner controller 302 saves the read image data in a RAM 303. Note that, the print controller 202 is able to cause the recording head 8 to perform the recording operation based on the image data read by the scanner controller 302 by converting the acquired image data into the recording data as described above.

Figure 3:
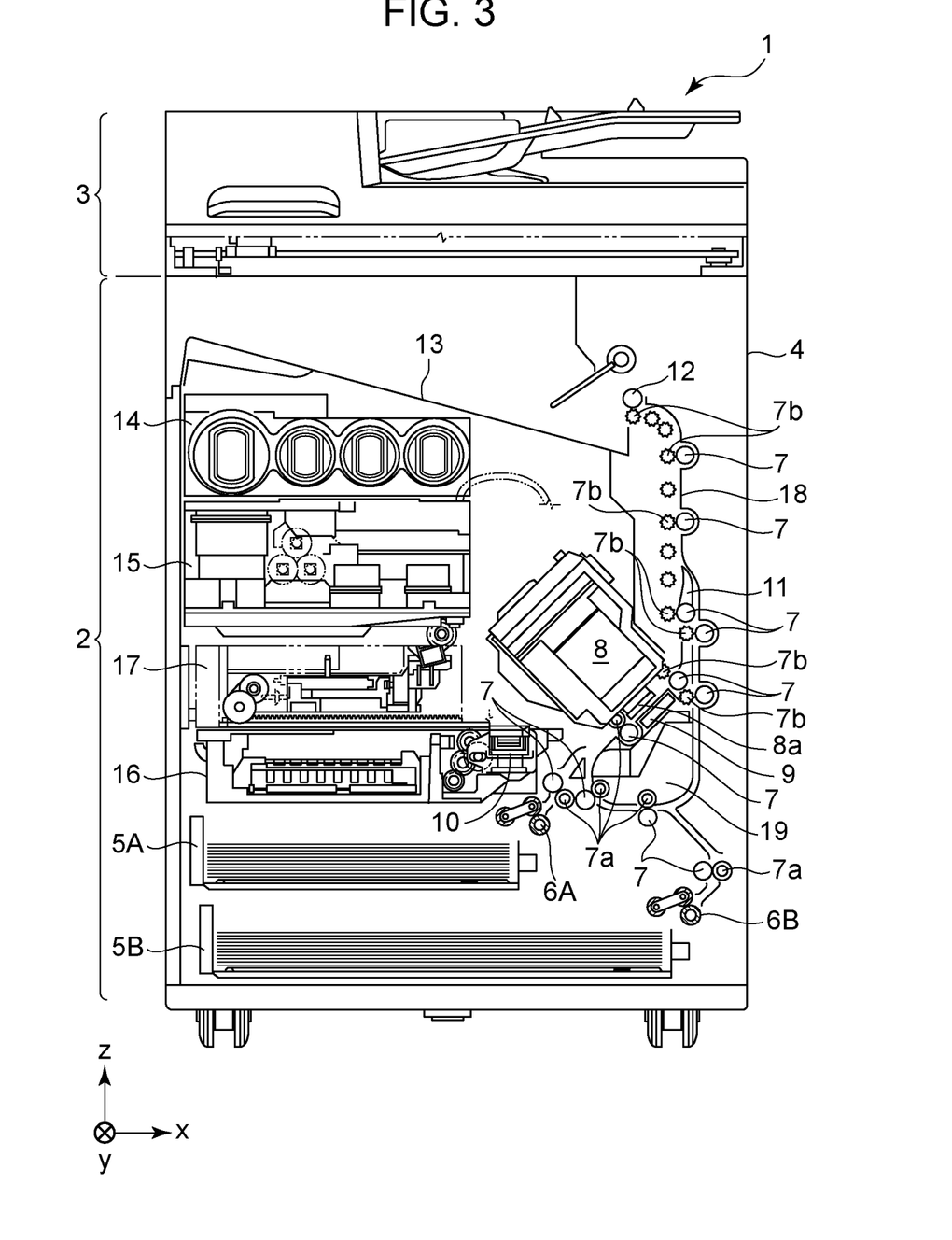
FIG. 3 illustrates the inkjet recording apparatus in a recording state.

FIG. 3 illustrates the recording apparatus 1 in a recording state. Compared to the standby state illustrated in FIG. 1, the cap unit 10 is separated from the ejection port surface 8a of the recording head 8, and the ejection port surface 8a faces the platen 9. In the present embodiment, a plane of the platen 9 is tilted at about 45 degrees with respect to the horizontal direction, and the ejection port surface 8a of the recording head 8 at the recording position is also tilted at about 45 degrees with respect to the horizontal direction so that a distance between the ejection port surface 8a and the platen 9 is kept at a fixed distance.

To move the recording head 8 from the standby position illustrated in FIG. 1 to the recording position illustrated in FIG. 3, the print controller 202 lowers the cap unit 10 to a retreat position illustrated in FIG. 3 by using the maintenance control unit 210. Thereby, the ejection port surface 8a of the recording head 8 is separated from a cap member 10a. Then, by using the head carriage control unit 208, the print controller 202 rotates the recording head 8 by 45 degrees while lowering a height of the recoding head 8 in the vertical direction so that the ejection port surface 8a faces the platen 9. The print controller 202 performs a process opposite to that described above to move the recording head 8 from the recording position to the standby position after completion of the recording operation.

Figure 4:
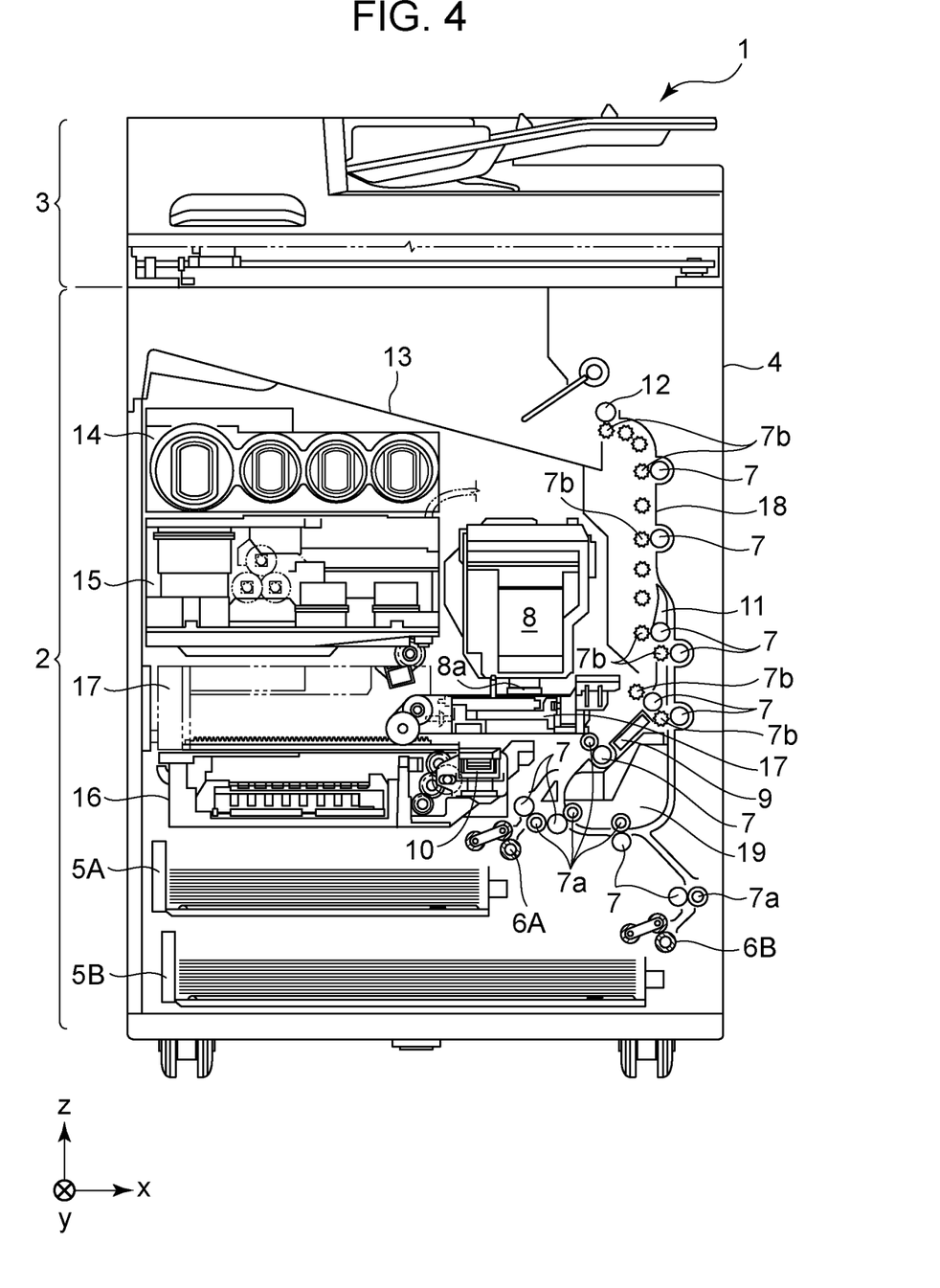
FIG. 4 illustrates the inkjet recording apparatus in a maintenance state.

FIG. 4 illustrates the recording apparatus 1 in the maintenance state. To move the recording head 8 from the standby position illustrated in FIG. 1 to a maintenance position illustrated in FIG. 4, the print controller 202 firstly moves the recording head 8 diagonally upward in the vertical direction and moves the cap unit 10 downward in the vertical direction. The print controller 202 then moves the wiping unit 17 in a rightward direction in FIG. 4 from its retreat position. After that, the print controller 202 moves the recording head 8 downward in the vertical direction to move the recording head 8 to the maintenance position at which the maintenance operation is able to be performed.

On the other hand, to move the recording head 8 from the recording position illustrated in FIG. 3 to the maintenance position illustrated in FIG. 4, the print controller 202 firstly moves the recording head 8 upward in the vertical direction while rotating the recording head 8 by about 45 degrees. The print controller 202 then moves the wiping unit 17 in the rightward direction from its retreat position. After that, the print controller 202 moves the recording head 8 downward in the vertical direction to move the recording head 8 to the maintenance position at which the maintenance operation by the maintenance unit 16 is able to be performed.

<Ink Supply Unit>

Figure 5:
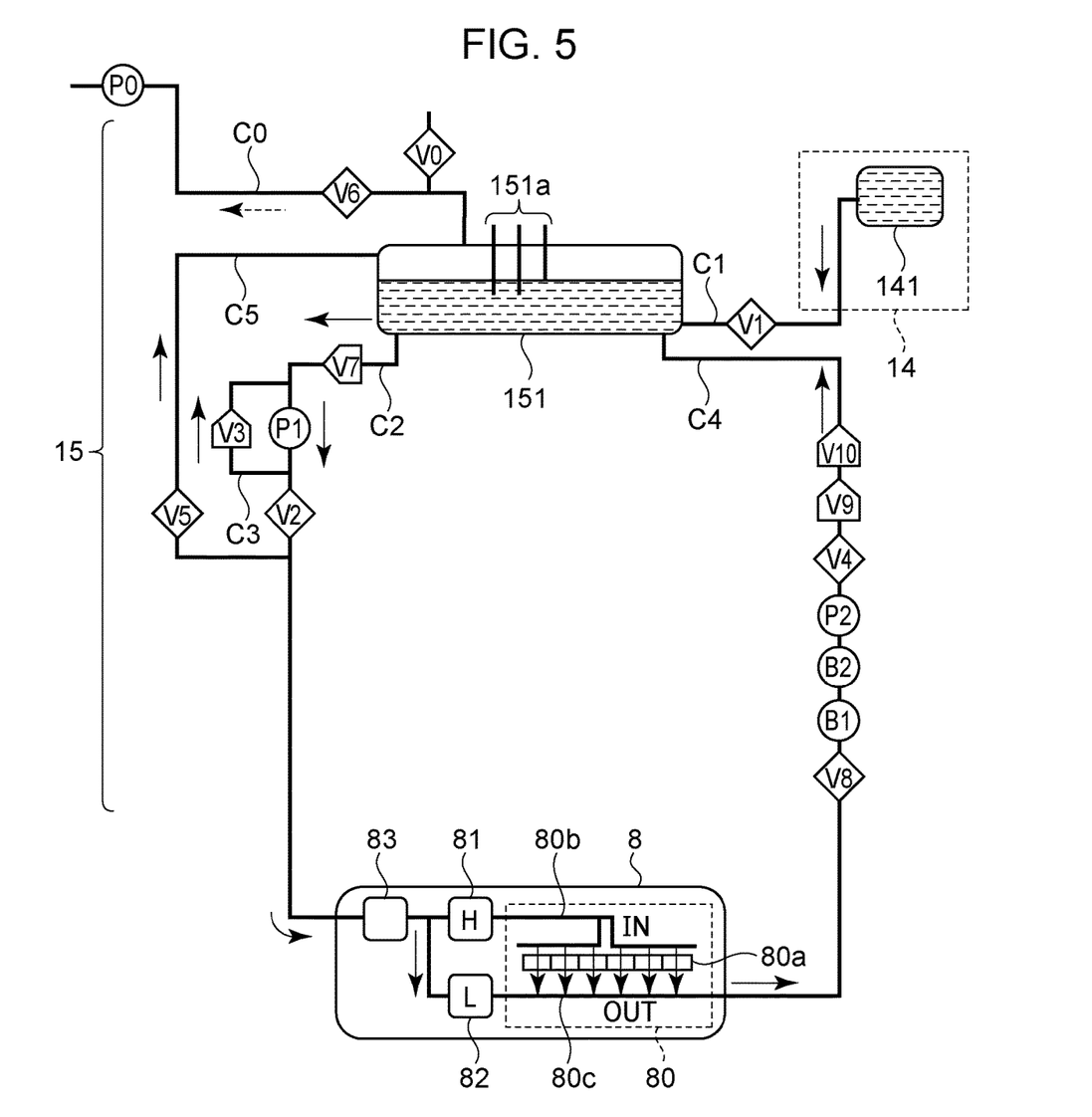
FIG. 5 is a schematic view illustrating a configuration of an ink supply unit.

FIG. 5 is a schematic view of the ink supply unit 15 including a peripheral configuration. A channel configuration of an ink circulation system of the present embodiment will be described with reference to FIG. 5. The ink supply unit 15 has a configuration in which ink is supplied from the ink tank unit 14 to the recording head 8. Though FIG. 5 illustrates a configuration relating to ink of one color, a similar configuration is prepared for each of ink colors (for example, cyan, magenta, yellow, and black) in the recording apparatus 1. The ink supply unit 15 is controlled basically by the ink supply control unit 209 illustrated in FIG. 2. Each configuration of the ink supply unit 15 will be described below.

The ink circulates mainly between a sub tank 151 and the recording head 8. In the recording head 8, an ejection operation of the ink is performed on the basis of image data and ink that is not ejected is collected again to the sub tank 151.

The sub tank 151 that stores a predetermined amount of ink is connected to a supply channel C2 for supplying ink to the recording head 8 and a collection channel C4 for collecting ink from the recording head 8. That is, a circulation path through which ink circulates is formed by the sub tank 151, the supply channel C2, the recording head 8, and the collection channel C4. An upper part of the sub tank 151 is connected to an air channel C0 in which the air flows.

The sub tank 151 includes a liquid surface detection unit 151a constituted by a plurality of electrode pins, and the ink supply control unit 209 is able to grasp a height of an ink liquid surface, that is, a remaining amount of ink within the sub tank 151 by detecting whether or not there is a conduction current between the plurality of pins. The sub tank 151 to which ink is supplied has an ink chamber which is in a lower part thereof and in which ink is accumulated and has an air chamber which is in an upper part thereof and in which no ink is accumulated. A decompression pump P0 is a negative pressure generation source for decompressing an inside of a tank of the sub tank 151. An atmosphere open valve V0 is a valve for switching whether or not to cause the inside of the sub tank 151 to communicate with the atmosphere.

A main tank 141 is a tank that stores ink to be supplied to the sub tank 151. The main tank 141 has a configuration attachable to and detachable from a recording apparatus main body. On the way of a tank connection channel C1 that connects the sub tank 151 and the main tank 141, a tank supply valve V1 for switching connection of the sub tank 151 and the main tank 141 is arranged.

When the liquid surface detection unit 151a detects that the amount of ink within the sub tank 151 becomes smaller than a predetermined amount, the ink supply control unit 209 closes the atmosphere open valve V0, a supply valve V2, a collection valve V4, and a head exchange valve V5. The ink supply control unit 209 further opens the tank supply valve V1 and a sub tank decompression valve V6. In this state, the ink supply control unit 209 causes the decompression pump P0 to operate. Then, the pressure inside the sub tank 151 becomes negative and ink is supplied from the main tank 141 to the sub tank 151. When the liquid surface detection unit 151*a* detects that the amount of ink within the sub tank 151 exceeds a predetermined amount, the ink supply control unit 209 closes the tank supply valve V1 and the sub tank decompression valve V6 and stops the decompression pump P0.

The supply channel C2 is a channel for supplying ink from the sub tank 151 to the recording head 8, and on the way of the supply channel C2, a supply pump P1 and the supply valve V2 of a driving type are arranged. During the recording operation, by driving the supply pump P1 in a state where the supply valve V2 is opened, it is possible to supply ink to the recording head 8. An amount of ink ejected by the recording head 8 per unit time fluctuates depending on image data. A flow rate of the supply pump P1 is set so as to be compatible also with a case where the recording head 8 performs an ejection operation in which an amount of ink consumption per unit time reaches a maximum amount, and the supply pump P1 is driven with a driving amount compatible with the flow rate.

Further, a first check valve V7 that prevents ink from flowing backward from the recording head 8 to the sub tank 151 is arranged in the supply channel C2. The first check valve V7 is a valve that allows ink to flow in one direction and regulates a flow of the ink in the opposite direction, and is opened or closed in accordance with a difference in the pressure between the upstream and downstream sides of the valve. Accordingly, the first check valve V7, the supply pump P1, and the supply valve V2 are arranged in this order in the supply channel C2 from a side closer to the sub tank 151.

A relief channel C3 is a channel having one end connected to a part between the first check valve V7 and the supply pump P1 and the other end connected to a part between the supply pump P1 and the supply valve V2, and a relief valve V3 which is a differential pressure valve is provided on the way of the relief channel C3. The relief valve V3 is not opened or closed by a driving mechanism, but is configured to be closed by an urging member such as a spring and opened against an urging force when a predetermined pressure is reached. For example, in a case where an amount of ink supply from the supply pump P1 per unit time is greater than a total value of an ejection amount of the recording head 8 per unit time and a flow rate of a collection pump P2 per unit time, the relief valve V3 is opened in accordance with the pressure applied to the relief valve V3. Consequently, a cyclic channel constituted by a part of the supply channel C2 and the relief channel C3 is formed. Such a configuration of the relief channel C3 is provided so that a pressure of ink supply to the recording head 8 is adjusted in accordance with the amount of ink consumption in the recording head 8 and a pressure in the circulation path is able to be stabilized regardless of image data.

The collection channel C4 is a channel for collecting ink from the recording head 8 to the sub tank 151, and on the way of the collection channel C4, the collection pump P2, the collection valve V4, a buffer chamber shut-off valve V8, a second check valve V9, and a third check valve V10 are arranged. A first buffer chamber B1, a second buffer chamber B2, and the collection pump P2 are further arranged in the collection channel C4. To circulate ink in the circulation path, the collection pump P2 becomes a negative pressure generation source and sucks the ink from the recording head 8. The collection pump P2 is driven so that a suitable difference in pressure is generated between an IN-channel 80*b* and an OUT-channel 80*c* in the recording head 8, and the ink is allowed to circulate from the IN-channel 80*b* to the OUT-channel 80*c* (refer to FIGS. 6A and 6B). Details of a channel configuration in the recording head 8 will be described later.

The second check valve V9 and the third check valve V10 are valves that prevent ink from flowing backward from the sub tank 151 to the recording head 8. In the circulation path of the present embodiment, the sub tank 151 is arranged above the recording head 8 in the vertical direction (refer to FIG. 1). Therefore, when the supply pump P1 or the collection pump P2 is not driven, ink may flow backward from the sub tank 151 to the recording head 8 due to a water head difference between the sub tank 151 and the recording head 8. In order to prevent such a backflow, in the present embodiment, the second check valve V7 is provided in the collection channel C4. Though two check valves are provided as a reserve in the present embodiment, one or more check valves may be provided.

The collection valve V4 is provided between the collection pump P2 and the second check valve V9, is a valve of a driving type similarly to the supply valve V2, and is opened when the recording operation is performed. Since the collection valve V4 is closed when the recording operation is not performed, the collection valve V4 functions as a check valve that prevents a backflow of ink similarly to the second check valve V9 and the third check valve V10.

The buffer chamber shut-off valve V8 is controlled by the ink supply control unit 209 so as to be closed when an operation of capping the recording head 8 by the cap unit 10 for suction is performed. Such control is performed in order for ink in a channel not to be unnecessarily sucked into the cap unit 10 during the suction. Note that, during the suction by the cap unit 10, the supply valve V2 and the head exchange valve V5 are controlled by the ink supply control unit 209 so as to be closed also in the supply channel C2.

The first buffer chamber B1 and the second buffer chamber B2 are parts used to reduce an effect of expansion and contraction of bubbles included in ink in a channel. The first buffer chamber B1 and the second buffer chamber B2 include a compression spring and a flexible member such as a film, and the film expands and contracts in accordance with extension and contraction of the compression spring. In a case where the bubbles included in the ink in the channel expand or contract due to a temperature change or the like in a state where the ink does not circulate, the first buffer chamber B1 and the second buffer chamber B2 expand or contract in accordance with a volume change of the bubbles. Accordingly, a pressure applied to an ejection port changes due to expansion or contraction of the bubbles so that leakage of the ink or suction of the air from the ejection port is able to be suppressed. Though two buffer chambers for expansion and contraction are provided in the present embodiment, one buffer chamber having both functions may be provided.

A head exchange channel C5 is a channel by which the supply channel C2 and an air chamber (space where no ink is stored) of the sub tank 151 are connected, and on the way of the head exchange channel C5, the head exchange valve V5 is arranged. One end of the head exchange channel C5 is connected to a part in the supply channel C2, which is on the upstream side of the recording head 8 and on the downstream side of the supply valve V2. The other end of the head exchange channel C5 is connected to an upper part of the sub tank 151 in a gravitational direction to communicate with the air chamber inside the sub tank 151. The head exchange channel C5 is used in a case where ink is drawn from the recording head 8 in use, such as a case where the recording head 8 is exchanged or a case where the recording apparatus 1 is transported. The head exchange valve V5 is controlled by the ink supply control unit 209 so as to be closed except for a case where the recording head 8 is filled with ink or a case where ink is drawn from the recording head 8.

Next, the channel configuration in the recording head 8 will be described. The ink supplied through the supply channel C2 to the recording head 8 passes through a filter 83 and is then supplied to a first negative pressure control unit 81 and a second negative pressure control unit 82. In the first negative pressure control unit 81, a control pressure is set to a small negative pressure (negative pressure whose pressure difference from an atmospheric pressure is small). In the second negative pressure control unit 82, a control pressure is set to a larger negative pressure (negative pressure whose pressure difference from the atmospheric pressure is larger) than that of the first negative pressure control unit 81. The pressures in the first negative pressure control unit 81 and the second negative pressure control unit 82 are generated in an appropriate range by driving of the collection pump P2.

In an ink ejection unit 80, a plurality of recording element substrates 80a on each of which a plurality of ejection ports are arrayed are arranged and a long ejection port row is formed. The common supply channel 80b (IN-channel) for guiding ink supplied by the first negative pressure control unit 81 and the common collection channel 80c (OUT-channel) for guiding ink supplied by the second negative pressure control unit 82 also extend in a direction in which the recording element substrates 80a are arrayed.

Figure 6A:
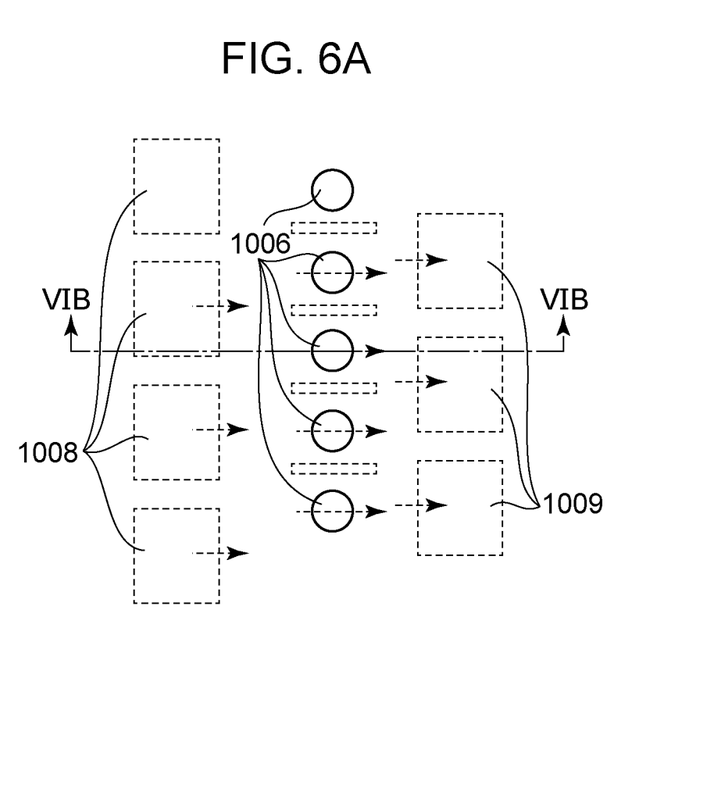
FIGS. 6A and 6B are views for explaining a detailed configuration of a recording head.
Figure 6B:
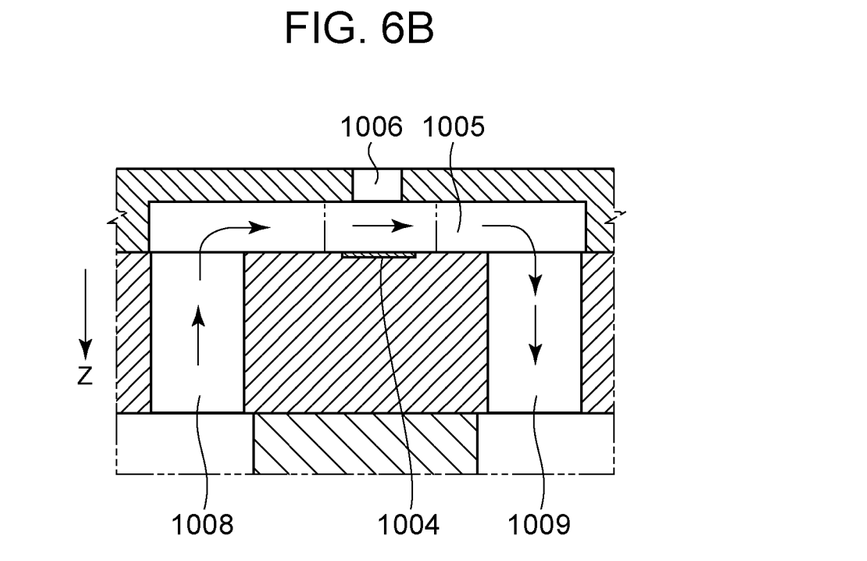

FIG. 6A is an enlarged schematic plan view illustrating a part of a recording element substrate 80a, and FIG. 6B is a schematic sectional view taken along a line VIb-VIb in FIG. 6A. The recording element substrate 80a includes a pressure chamber 1005 to be filled with ink and ejection ports 1006 for ejecting ink. In the pressure chamber 1005, a recording element 1004 is provided at a position facing an ejection port 1006. Further, the recording element substrate 80a includes, for the ejection ports 1006, a plurality of separate supply channels 1008 connected to the common supply channel 80b and a plurality of separate collection channels 1009 connected to the common collection channel 80c.

The aforementioned configuration generates a flow of ink in which the ink flows from the common supply channel 80b having a relatively small negative pressure (high absolute value of the pressure) into the common collection channel 80c having a relatively large negative pressure (low absolute value of the pressure) in the recording element substrate 80a. More specifically, the ink flows through the common supply channel 80b, a separate supply channel 1008, the pressure chamber 1005, a separate collection channel 1009, and the common collection channel 80c in this order. When ink is ejected by the recording element 1004, a part of the ink that moves from the common supply channel 80b to the common collection channel 80c is ejected from the ejection ports 1006 and thereby discharged outside the recording head 8. On the other hand, ink that is not ejected from the ejection ports 1006 moves through the common collection channel 80c to be collected to the collection channel C4.

When the recording operation is performed with the configuration illustrated in FIGS. 5, 6A, and 6B, the ink supply control unit 209 closes the tank supply valve V1, the head exchange valve V5, and the sub tank decompression valve V6, and opens the atmosphere open valve V0, the supply valve V2, the collection valve V4, and the buffer chamber shut-off valve V8. Then, the ink supply control unit 209 drives the supply pump P1 and the collection pump P2. Thereby, a circulation path of the sub tank 151, the supply channel C2, the recording head 8, the collection channel C4, and the sub tank 151 in this order is established. In a case where the amount of ink supply from the supply pump P1 per unit time is greater than the total value of the ejection amount of the recording head 8 per unit time and the flow rate of the collection pump P2 per unit time, ink flows from the supply channel C2 into the relief channel C3. In this manner, the excessively-supplied ink flows into the relief channel C3 so that the flow rate of the ink that flows from the supply channel C2 into the recording head 8 is adjusted.

On the other hand, when the recording operation is not performed, the ink supply control unit 209 stops the supply pump P1 and the collection pump P2 and closes the atmosphere open valve V0, the supply valve V2, the collection valve V4, and the buffer chamber shut-off valve V8. Thereby, the flow of the ink in the recording head 8 stops and a backflow due to a water head difference between the sub tank 151 and the recording head 8 is also suppressed. Further, by closing the atmosphere open valve V0, leakage or evaporation of ink from the sub tank 151 is suppressed.

When ink is drawn from the recording head 8 to the sub tank 151, the ink supply control unit 209 closes the atmosphere open valve V0, the tank supply valve V1, the supply valve V2, the collection valve V4, and the buffer chamber shut-off valve V8, opens the head exchange valve V5, and drives the decompression pump P0. Thereby, the inside of the sub tank 151 is brought into a negative pressure state and the ink in the recording head 8 is collected to the sub tank 151 through the head exchange channel C5. As described above, the head exchange valve V5 is a valve that is closed during a normal recording operation or standby and is opened when the ink is drawn from the recording head 8 to the sub tank 151. Note that, the head exchange valve V5 is opened also when the head exchange channel C5 is filled with ink in a filling process of the recording head 8.

<Channel Control Member (Channel Control Apparatus)>

Figure 7A:
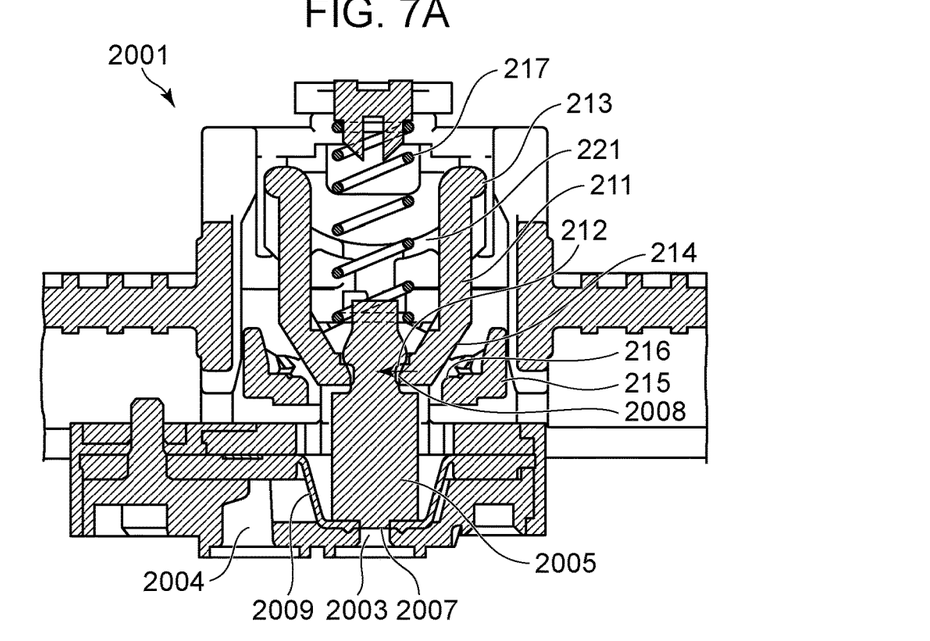
FIGS. 7A and 7B are sectional views each illustrating a channel open state and a channel closed state of a channel control member.
Figure 7B:
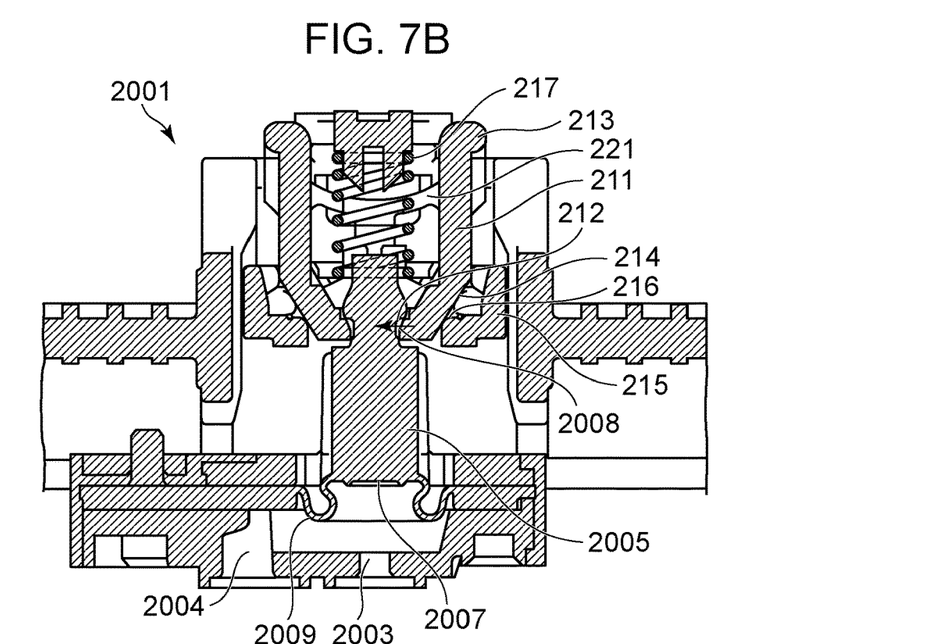

FIGS. 7A and 7B are sectional views each illustrating a detailed configuration of a driving valve commonly used in the atmosphere open valve V0, the tank supply valve V1, the supply valve V2, the collection valve V4, the head exchange valve V5, the sub tank decompression valve V6, and the buffer chamber shut-off valve V8. The driving valve thereof is a diaphragm valve that controls open and close of a channel by using a diaphragm and is referred to as a channel control member 2001 below.

In the channel control member 2001, a path from a first opening 2003 to a second opening 2004 forms a part of an ink channel. Ink flows from the first opening 2003 to the second opening 2004. A diaphragm 2005 is configured to be displaceable by a sealing portion 2007 that faces the first opening 2003 and is able to seal the first opening 2003, a flexible portion 2009 that is flexible, and a gripped portion 2008 that is gripped by a gripping member 211. The flexible portion 2009 is deformed in accordance with the displacement of the diaphragm 2005 in the up-down direction. The gripped portion 2008 has a constricted shape whose diameter (sectional area) is smaller than that of its peripheral part.

The gripping member 211 that grips the diaphragm 2005 is constituted by a gripping portion 212 that grips the gripped portion 2008 of the diaphragm 2005, a gripping release portion 213 that releases a gripping state of the gripping portion 212, a deformation portion 221, and an inclined surface portion 214. The gripping release portion 213 is arranged at a position apart from the gripping portion 212, and when the gripping release portion 213 is displaced to release the gripping portion 212 in the gripping state, the deformation portion 221 is elastically deformed. The inclined surface portion 214 is arranged at a position between the deformation portion 221 and the gripping portion 212 and facing an abutment surface (abutment portion) 216 of an actuator 215 described later. Further, the gripping member 211 is urged by an urging member 217 such as a spring in a downward direction at all times.

Figure 8:
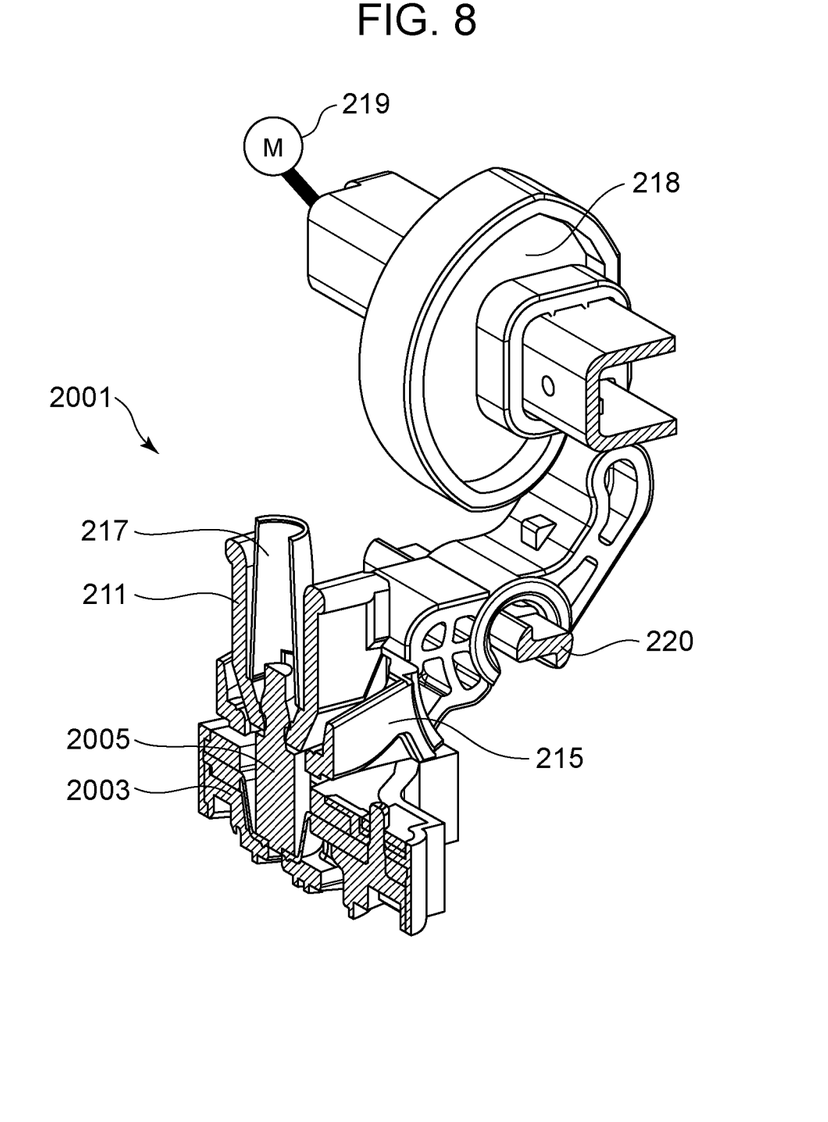
FIG. 8 is a schematic perspective view of the channel control member.

FIG. 8 is a perspective view mainly illustrating the channel control member 2001 and the actuator 215. FIG. 8 illustrates a state where the diaphragm 2005, the gripping member 211, and the actuator 215 are taken along the same plane as that of the sectional view of FIG. 7. The actuator 215 is axially supported by a shaft 220 in a pivotally movable manner so that the abutment surface 216 capable of abutting against the inclined surface portion 214 of the gripping member 211 is movable in the up-down direction. Upon driving of a driving source (motor) 219, a cam 218 rotates around the shaft 220, and therefore, the actuator 215 pivotally moves. As the actuator 215 pivotally moves, the abutment surface 216 is displaced in the up-down direction.

According to the aforementioned configuration, when the abutment surface 216 is displaced to a first position downward in the up-down direction by the driving of the driving source 219, the abutment surface 216 of the actuator 215 and the inclined surface portion 214 of the gripping member 211 are separated. Then, the gripping member 211 is urged by the urging member 217 and pushed downward. Thereby, the diaphragm 2005 is also displaced downward by the gripping member 211, and the sealing portion 2007 closes the first opening 2003 to shut off the channel as illustrated in FIG. 7A. That is, the diaphragm 2005 illustrated in FIG. 7A is at a closing position to close the channel.

On the other hand, when the abutment surface 216 is displaced to a second position upward in the up-down direction from the first position by the driving of the driving source 219, the abutment surface 216 of the actuator 215 abuts against the inclined surface portion 214 of the gripping member 216. Then, the gripping member 211 is lifted upward by the abutment surface 216 that is displaced in an upward direction. Thereby, the diaphragm 2005 is also displaced upward by the gripping member 211, and the sealing portion 2007 thereby opens the first opening 2003 to open the channel so that the first opening 2003 and the second opening 2004 communicate with each other (refer to FIG. 7B). That is, the diaphragm 2005 illustrated in FIG. 7B is at an opening position to open the channel.

According to such a configuration, only by displacing the gripping release portion 213 that is arranged being apart from the diaphragm 2005 in a place where there is a relatively sufficient space, the gripping member 211 is allowed to grip the diaphragm 2005. Accordingly, compared to a channel control member having a diaphragm 2005 of the related art, it is possible to facilitate assembly by an assembly operator or a robot arm.

Figure 9:
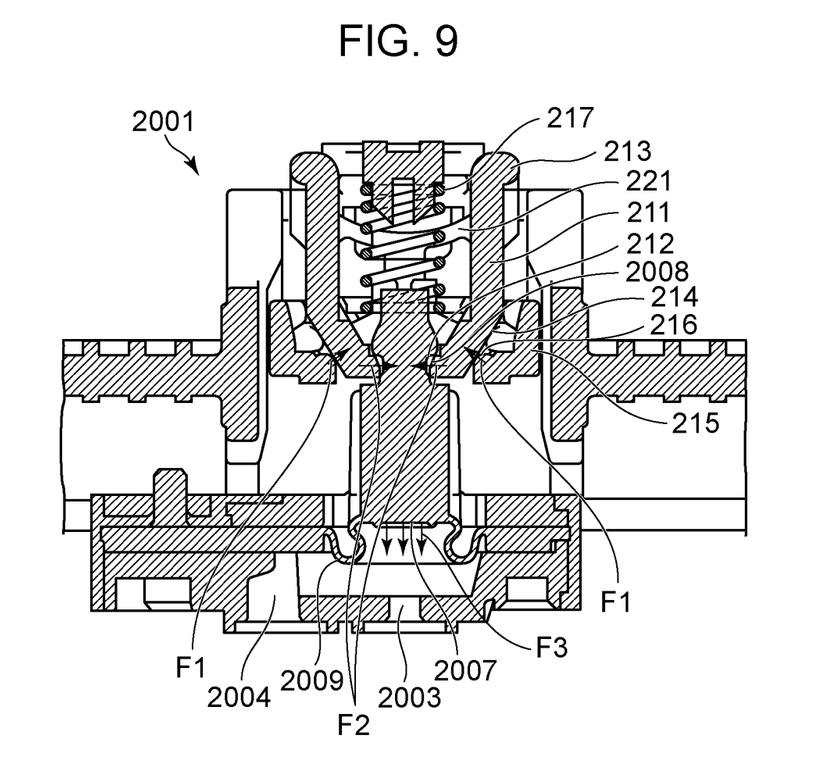
FIG. 9 is a view for explaining a force applied to the channel control member.

Further, when the actuator 215 is at the second position as illustrated in FIG. 9, a force F1 from the abutment surface 216 is applied to the inclined surface portion 214 of the gripping member 211, and therefore, a force F2 which is a horizontal component thereof is applied from the gripping portion 212 to the gripped portion 2008. That is, a force with which the gripping portion 212 grips the gripped portion 2008 of the diaphragm 2005 becomes stronger. Thus, even when a force F3 is received from the channel formed by the first opening 2003 and the second opening 2004 as illustrated in FIG. 9, detachment of the diaphragm 2005 from the gripping portion 212 is suppressed. Therefore, it is possible to form the channel control member 2001 with higher reliability. Accordingly, an inclination direction of the inclined surface portion 214 is not limited to the above as long as an aspect in which the force F2 of the horizontal component is generated by the abutment with the actuator 215 is achieved. That is, it is sufficient that the inclined surface portion 214 is able to apply a force in a direction in which the force with which the diaphragm 2005 is gripped increases, when the actuator 215 abuts against the inclined surface portion 214.

Note that, though the channel control member as the diaphragm valve has been described in the first embodiment, it is also possible to form a diaphragm pump that controls an inflow and an outflow of liquid by using a change in volume when the actuator 215 is displaced from the first position to the second position.

Though a configuration in which the actuator 215 is axially supported and pivotally moves upon an action of the cam 218, and then the abutment surface 216 is displaced in the up-down direction has been indicated in the first embodiment, a configuration in which the actuator 215 linearly moves by linear drive may be provided. Though a configuration in which the gripping member 211 is pushed down by the urging member 217 when the abutment surface 216 is displaced to the first position has been indicated, a configuration in which the sealing portion 2007 is pushed down by an elastic force of the flexible portion 2009 of the diaphragm 2005 may be provided.

That is, according to the disclosure, it is possible to provide a channel control apparatus that is very reliable with a simple configuration.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-184605, filed Sep. 28, 2018, which is hereby incorporated by reference herein in its entirety.

What is claimed is:

1. A channel control apparatus comprising:
    a diaphragm portion displaceable between an opening position to open a channel and a closing position to close the channel;
    an abutment portion for moving in a first direction and a second direction opposite to the first direction by a driving source; and
    a gripping member that has an inclined surface portion for abutting against the abutment portion and grips the diaphragm portion,
    wherein in a case where the abutment portion moves in the first direction, the gripping member displaces the diaphragm portion to the opening position by the abutment portion abutting against the inclined surface portion, and in a case where the abutment portion moves in the second direction, the gripping member displaces the diaphragm portion to the closing position by the abutment portion being separated from the inclined surface portion.

2. The channel control apparatus according to claim 1, wherein the inclined surface portion is inclined in a direction in which a force with which the diaphragm portion is gripped increases by abutment against the abutment portion.

3. The channel control apparatus according to claim 1, wherein the diaphragm portion has a gripped portion that has a sectional area smaller than that of a peripheral part and is gripped by the gripping member.

4. The channel control apparatus according to claim 1, wherein the abutment portion is an actuator displaced by a motor axially supported in a pivotally movable manner.

5. An inkjet recording apparatus comprising:
a recording head that ejects ink; and
at least one channel control apparatus,
the at least one channel control apparatus including,
  a diaphragm portion displaceable between an opening position to open a channel and a closing position to close the channel,
  an abutment portion for moving in a first direction and a second direction opposite to the first direction by a driving source, and
  a gripping member that has an inclined surface portion for abutting against the abutment portion and grips the diaphragm portion,
wherein when the abutment portion moves in the first direction, the gripping member displaces the diaphragm portion to the opening position by the abutment portion abutting against the inclined surface portion, and
wherein when the abutment portion moves in the second direction, the gripping member displaces the diaphragm portion to the closing position by the abutment portion being separated from the inclined surface portion.

6. The inkjet recording apparatus according to claim 5, wherein the inclined surface portion is inclined in a direction in which a force with which the diaphragm portion is gripped increases by abutment against the abutment portion.

7. The inkjet recording apparatus according to claim 5, further comprising:
a tank that accumulates ink supplied to the recording head;
a supply channel by which ink is supplied from the tank to the recording head; and
a collection channel by which ink is collected from the recording head to the tank,
wherein the at least one channel control apparatus includes channel control apparatuses, and
wherein the channel control apparatuses are arranged in the supply channel and the collection channel.

* * * * *